US010049830B2

(12) United States Patent
Pham et al.

(10) Patent No.: US 10,049,830 B2
(45) Date of Patent: Aug. 14, 2018

(54) RELAY ARCHITECTURE FOR TRANSFERRING FROM REDUNDANT POWER SOURCES

(71) Applicant: Amazon Technologies, Inc., Seattle, WA (US)

(72) Inventors: Hoang Pham, Seattle, WA (US); Yuan Kong, Kirkland, WA (US); Richard Arvel Stevens, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 406 days.

(21) Appl. No.: 14/752,231

(22) Filed: Jun. 26, 2015

(65) Prior Publication Data

US 2016/0379768 A1 Dec. 29, 2016

(51) Int. Cl.
*H02J 9/06* (2006.01)
*H01H 9/20* (2006.01)
*G06F 1/30* (2006.01)

(52) U.S. Cl.
CPC .............. *H01H 9/20* (2013.01); *G06F 1/30* (2013.01); *H02J 9/061* (2013.01)

(58) Field of Classification Search
CPC .............. H01H 9/20; H02J 9/061; G06F 1/30
USPC ......................................................... 307/142
See application file for complete search history.

(56) References Cited

U.S. PATENT DOCUMENTS

| 3,662,182 | A | 5/1972 | Renato et al. | |
|---|---|---|---|---|
| 6,051,893 | A | 4/2000 | Kishida et al. | |
| 6,465,911 | B1 | 10/2002 | Kamiyama et al. | |
| 7,187,563 | B1 * | 3/2007 | Bobrek | H02M 1/10 363/21.01 |
| 9,627,924 | B2 * | 4/2017 | Larson | H02J 9/06 |
| 2011/0260538 | A1 * | 10/2011 | Huang | H02J 9/062 307/64 |
| 2013/0106190 | A1 | 5/2013 | Lin et al. | |
| 2017/0317526 | A1 * | 11/2017 | Wang | H02J 9/061 |

OTHER PUBLICATIONS

PCT/US2016/038918, "International Search Report and Written Opinion", dated Oct. 12, 2016, 10 pages.
AU2016282697, "First Examination Report", dated Jun. 6, 2018, 3 pages.

* cited by examiner

*Primary Examiner* — Dinh T Le
(74) *Attorney, Agent, or Firm* — Kilpatrick Townsend & Stockton LLP

(57) ABSTRACT

Automatic transfer switching apparatus and systems include a switching device including an input line, a sensor, and a parallel assembly of a solid-state relay and latching relay electrically connected with the input line. The solid-state relay is used to short the latching relay such that the latching relay can be opened and/or closed in an unloaded state while the input line is energized.

19 Claims, 6 Drawing Sheets

RELAY ARCHITECTURE FOR TRANSFERRING FROM REDUNDANT POWER SOURCES

BACKGROUND

A datacenter typically contains a collection of computer servers and components for the management, operation and connectivity of those servers, including power management components such as automatic transfer switches. Although intended to improve the functionality and consistent operation of datacenter components, existing automatic transfer switches can fail and consume significant amounts of electrical power.

BRIEF DESCRIPTION OF THE DRAWINGS

Various embodiments in accordance with the present disclosure will be described with reference to the drawings, in which.

DETAILED DESCRIPTION

Figure 1:
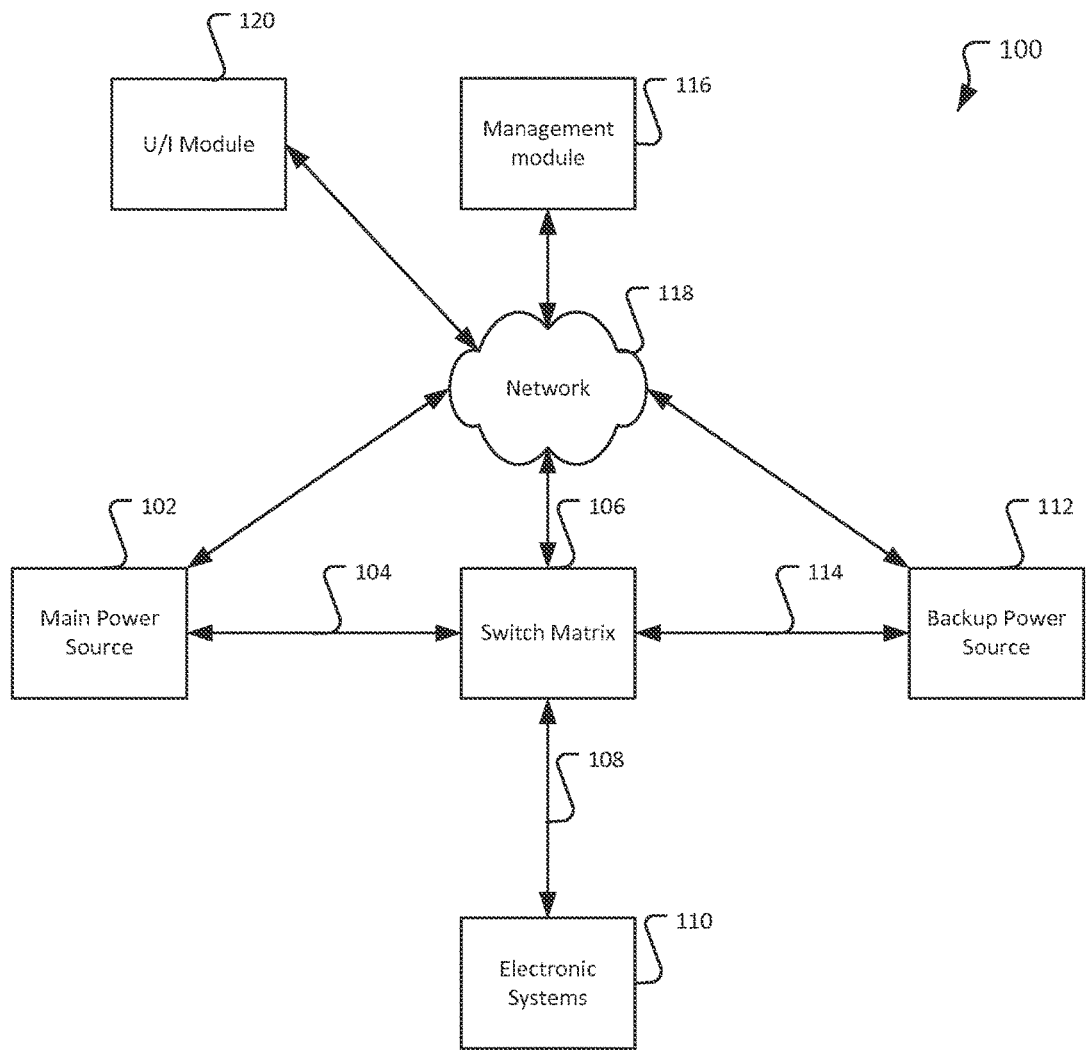
FIG. 1 is a high-level block diagram of a system for switching between power sources, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a modern datacenter, the continuity of power to servers and other computer devices can be maintained by employing redundant power supplies. In conventional systems, two or more redundant AC or DC power supplies may be used. An automatic transfer switch can be used to monitor the power supplied by a primary power supply to downstream electronics and cause a switch to a secondary power supply if the primary power supply fails. Switching is accomplished by causing a mechanical relay between the primary power supply and the electronics to open while another mechanical relay between the secondary power supply and the electronics is closed. Monitoring a power supply is, however, a process that consumes power and can produce wear on the components used. Furthermore, the switching act can cause a significant power surge through the switching components, which can cause degradation and/or damage to the switching components. Moreover, if the secondary power supply is not configured properly, the switching act can also cause damage to downstream electronic components in the datacenter.

Embodiments herein described include systems and methods for transferring between two redundant AC power supplies using a switching matrix that include one or more TRIAC devices. A TRIAC device is a thyristor capable of switching using a small gate current. TRIAC devices can be used in both AC and DC circuits. A TRIAC device can be triggered to conduct current by a small (milliampere-scale) gate current. Once triggered, a TRIAC device continues to conduct until a current across the TRIAC device drops to zero. In an AC system, the current crosses zero at each half-cycle of the AC cycle. In many embodiments, a TRIAC is held in a conductive state by providing a pulse at each half-cycle of the AC cycle or by providing a continuous gate control signal.

In many embodiments, TRIAC devices are used to temporarily conduct power so as to "unload" electrical relays so that the electrical relays can be switched while no power is being conducted by the relays. In many embodiments, the two redundant AC power supplies include a main power source and a backup power source. In many embodiments, when the main power source begins to fail, a TRIAC device on the main power line is turned on to temporarily conduct power transferred from the main power line thereby unloading electrical relays used to transfer power from the main power line. The unloaded electrical relays are then opened without risking damage that can occur to the electrical relays if the electrical relays were opened while transferring significant current levels. A TRIAC device can be used to temporarily transfer power from the backup power source so as to allow electrical relays for transferring power from the backup power source to be closed while unloaded. Both TRIAC devices can be turned off when the transfer of power supply from the main power source to the backup power source is complete.

While embodiments are described herein as including TRIAC devices, any suitable solid-state relay can be employed in place of a TRIAC device. For example, an SSR based on a single MOSFET, or multiple MOSFETs in a parallel array, can be used to switch direct current loads. For switching alternating current loads, two MOSFETs can be used and arranged back-to-back with their source pins tied together. In AC circuits, a silicon-controlled rectifier (SCR) or TRIAC relay inherently switch off at the points of zero load current. Accordingly, a control signal can be continually applied to keep the relay closed or periodically applied to prevent the relay from opening during zero load current periods.

Turning now to the figures, FIG. 1 illustrates an example system 100 for switching between redundant power supplies. The system 100 includes a main power input line 104, a switch matrix 106, an output line 108, and a backup power input line 114. The system 100 can further include a main power source 102, an electronic system(s) 110, a backup power source 112, a management module 116, a network 118, and/or a user interface module 120. The main power source 102 supplies power to the switch matrix 106 via the main power input line 104. Under typical operating conditions, the switch matrix 106 connects the main power input line 104 with the output line 108, which is connected to the electronic system(s) 110. The backup power source 112 is connected to the switch matrix 106 via the backup power line input 114, which, under the typical operating conditions, is not electrically connected to the output line 108. The switch matrix 106 is operable to cause a power supply switch by disconnecting the main power input line 104 from the output line 108 and connecting the backup power input line 114 with the output line 108.

In some embodiments, the switch matrix 106 is configured to detect an irregularity in the voltage and/or current received on the main line input 104 and, upon detecting the irregularity, switch to supplying power received from the main power source 102 to supplying power received from the backup power source 112. In some embodiments, the switch matrix 106 is controlled via instructions received from the management module 116 via the network 118. In some embodiments, the switch matrix 106 is configured to determine that an irregularity has occurred via information received from the main power source 102, the management module 116, and/or the user interface module 120. In some embodiments, the management module 116 monitors data received via the network 118 from any of the user interface module 120, the main power source 102 or switch matrix 106 and determines whether an irregularity has occurred, and provides instructions that cause the switch matrix to switch to supplying power via the backup power source from the main power source or from the backup power source to the main power source. In some embodiments, the switch matrix 106 and/or the management module 116 are configured to receive information concerning the power quality at the backup power source 112 (for example, whether power via the backup power source is available) and prevent switching from occurring if power from the backup power source is unavailable or if the quality of power available from the backup power source does not meet a predetermined quality level. The switch matrix 106 can also be caused to switch between supplying power from the main power supply to power from the backup power supply via instructions received from the user interface module 120 via the network 118. For example, a user can use the user interface 120 to control the switch matrix 106 to disconnect the output line from the main power source 102 for any suitable purpose, such as de-energizing components to allow the components to be maintained or replaced.

Figure 2:
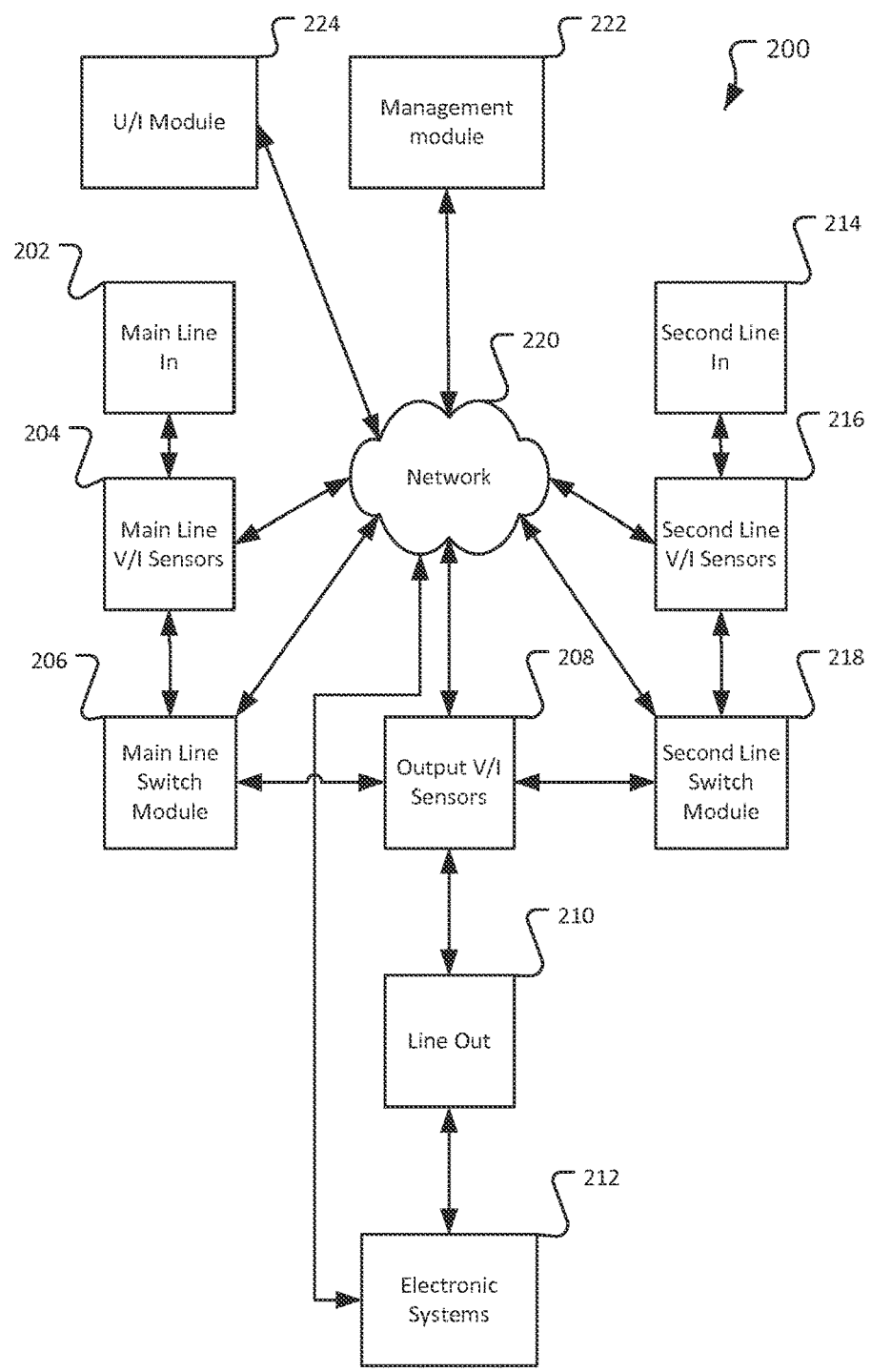
FIG. 2 is a block diagram of an example system for switching between power sources, in accordance with the system of FIG. 1.

FIG. 2 illustrates a more detailed example system 200 for switching between redundant power supplies, in accordance with many embodiments, and in accordance with embodiments of the system 100 of FIG. 1. The system 200 includes a main line in 202, main line sensors 204 (e.g., voltage sensor(s) and/or current sensor(s)) connected with the main line in, and a main line switch module 206. The main line in 202 is configured to receive power from a main power supply. The main line switch module 206 is, during typical operation, configured in an "on" state such that current passes from the main line in 202 to electronic systems 212 downstream via a line out 210. The main line sensors 204 monitor power supplied to the main line switch module 206 via the main line in 202. Output sensors 208 (e.g., voltage sensor(s) and/or current sensor(s)) monitor power supplied to the electronics systems 212 via the line out 210. A second line in 214 is configured to receive power from a secondary or backup power supply. The second line 214 transfers power to a second line switch module 218, which, during typical operation, is configured in an "off" position such that no current flows from the second line switch module 218 to the electronic systems 212 via the line out 210. Second line sensors 216 (e.g., voltage sensor(s) and/or current sensor (s)) monitor power supplied to the second line switch module 218 via the second line in 214.

Any of, or any suitable combination of, the main line sensors 204, main line switch module 206, output sensors 208, second line switch module 218, second line sensors 216, and electronic systems 212 can be in communication via a network 220 with one another and/or with a management module 222. The management module 222 can include instructions to cause a switching act when, for example, an irregularity in either or both of voltage and current has been detected at any of the main line sensors 204, main line switch module 206, output sensors 208, or electronic systems 212. Furthermore, the management module 222 can include instructions to cause a switching act when an irregularity exceeds a predetermined threshold value, which may include a fluctuation below a nominal value in either voltage and/or current by a predetermined amount(s).

The management module 222 can also receive information from the second line sensors 216 and/or the second line switching module 218 regarding the availability of power at the second line in 214. If power is unavailable at the second line in 214 or is of insufficient quality, the management module 222 can prevent a switching act, or can initiate an alert to a user at the U/I module 224. The management module 222 can also detect a current quality at the second line sensors 216 or second line switch module 218 and, using the quality, determine an optimal point in time to complete a switching act. The management module 222 can also receive instructions via the network 220 from the U/I module 224 to instigate a switching act in the absence of receiving information concerning any irregularity in the power supply.

Figure 3:
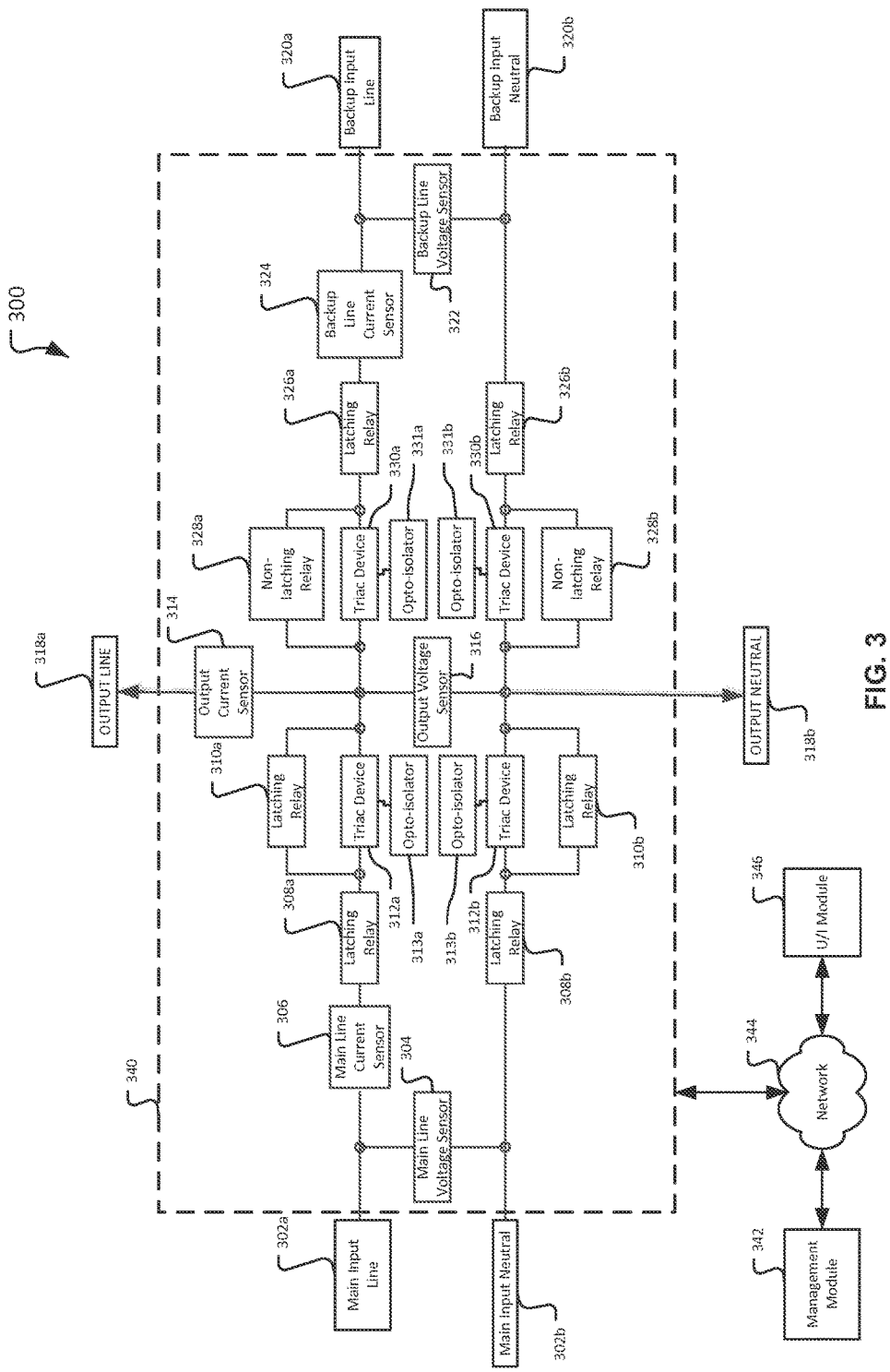
FIG. 3 is a detailed block diagram of an example system for switching between power sources, in accordance with the system of FIG. 1.

FIG. 3 illustrates a detailed block diagram of an example system 300 for arranging redundant power supplies, in accordance with embodiments, and in accordance with embodiments of the system 100 of FIG. 1. The system 300 includes a main input line 302*a* and neutral 302*b*, a main line voltage sensor 304 measuring the voltage of the main input line, and a main line current sensor 306 for measuring the current of the main input line. The main input line 302*a* and neutral 302*b* connect downstream with first main latching relays 308*a*, 308*b* and, in parallel, second main latching relays 310*a*, 310*b* and main line TRIAC devices 312*a*, 312*b*. During ordinary operation, the main line TRIAC devices are off (non-conducting) and the main line latching relays 308*a*, 308*b*, 310*a*, 310*b* are closed (conducting) such that the main input line 302*a* and neutral 302*b* are electrically connected with the output line 318*a* and output neutral 318*b*. Output current sensor 314 and output voltage sensor 316 measure current and voltage quality, respectively, at the output line 318 and output neutral 318*b*.

The system 300 also includes a backup input line 320*a* and backup input neutral 320*b*, a backup input voltage sensor 322 measuring the voltage of the backup input line, and a backup line current sensor 324 for measuring the current of the backup input line. The backup input line 320*a* and neutral 320*b* connect downstream (toward the output line 318*a* and the output neutral 318*b*) with first backup latching relays 326*a*, 326*b* and, in parallel, backup non-latching relays 328*a*, 328*b* and backup line TRIAC devices 330*a*, 330*b*. During ordinary operation, the backup line TRIAC devices are off (non-conducting) and the backup line non-latching relays 328*a*, 328*b* are open (non-conducting) such that the backup input line 320*a* and neutral 320*b* are not electrically connected with the output line 318*a* and output neutral 318*b*. The first backup latching relays 326*a*, 326*b* are open (non-conducting) such that, in ordinary operation, no current flows through these relays. The current sensors 306, 314, and 324 can include any suitable current sensing device, such as Hall Effect sensors. The voltage sensors 304, 316, and 322 can include any suitable voltage sensing device, for example, high-voltage monitoring devices with minimal current pass-through.

Any suitable combination of the latching relays 308*a*, 308*b*, 310*a*, 310*b*, 326*a*, 326*b*; non-latching relays 328*a*, 328*b*; TRIAC devices 312*a*, 312*b*, 330*a*, 330*b*, and sensors 304, 306, 322, 324, 314, 316 can communicate with a management module 342 via a network 344. In some embodiments, the management module is distributed among the components described above, or may be a computer system or systems that are connected with the above components. In some embodiments, the sensors, relays, and TRIAC devices described above are incorporated into a switch matrix 340. In some cases, the switch matrix 340 can be an integrated device. The management module 342 can communicate with the above components via the network 344 to cause a switch action to occur based on data received from one or more of the sensors described above, or may receive instructions via the network 344 from a U/I module 346 to cause a switch action to occur. The management module 342 can include one or more computer systems configured with executable instructions for carrying out a switching act such as described below.

In the illustrated embodiment of the system 300, each of the TRIAC devices 312a, 312b, 330a, 330b is connected to and controlled by a respective opto-isolator 313a, 313b, 331a, 331b. Each of the opto-isolators 313a, 313b, 331a, 331b is used to optically control the state of the TRIAC devices 312a, 312b, 330a, 330b and thereby isolate the TRIAC devices 312a, 312b, 330a, 330b from possible voltage surges, which can be induced by, for example, lightning, electrostatic discharge, radio frequency transmissions, switching pulses (spikes) and perturbations in power supply.

In a switching action, the main line TRIAC devices 312a, 312b, if not already in a conducting state are placed in a conducting state. When in a conducting state, the main line TRIAC devices 312a, 312b provide an alternate current path around the second main line latching relays 310a and 310b. Prior to the switching action, the main line TRIAC devices 312a, 312b can optionally be kept in a non-conducting state to reduce power consumption. When the second main line latching relays 310a and 310b are shorted via the alternate current path, these relays can be opened with minimal stress on the relay components. The power supply from the main input line 302a can be subsequently cut off by turning off the main line TRIAC devices 312a, 312b, after which the first main line latching relays 308a, 308b can be opened as well, thereby disconnecting the output line 318a from the main input line 302a. When the main line TRIAC devices 312a, 312b are turned off and the power supplied by the main input line 302a, 302b is cut off, the backup line TRIAC devices 330a, 330b can be turned on, causing power to be connected from the backup input line 320a, 320b to the output line 318a, 318b. The non-latching relays 328a, 328b can then be closed while unloaded via the alternate current paths provided by the TRIAC devices 330a, 330b, and the backup line TRIAC devices 330a, 330b can then be turned off.

The latching relays retain an open or a closed state absent any supplied signal instructing the latching relay to switch state. In other words, an open latching relay will remain open and a closed latching relay will remain closed absent a signal instructing a state change. The non-latching relays, by contrast, return to a default state absent a supplied signal. The default state of the backup non-latching relays 328a, 328b is open. The use of non-latching relays for the backup relays 328a, 328b serves to guarantee that the backup relays 328a, 328b are open upon startup. Alternatively, latching relays can be used for the backup relays 328a, 328b. A small power draw is required to retain the non-latching relays 328a, 328b in a closed state. The use of non-latching relays can provide for additional security against a surge due to the resilience of non-latching relays against changing state due to mechanical shock (e.g., during transportation prior to deployment). The first main line latching relays 308a, 308b and first backup line latching relays 326a, 326b can be used as a second layer of security for breaking the circuit, and in at least one alternative embodiment, these latching relays can be omitted.

In some embodiments, the switch matrix 340 and/or the management module 342 communicate via a network with other instances of switch matrices and/or management modules. The management module 342 can control multiple switch matrices like switch matrix 340. In some embodiments, the switch matrix 340 and/or management module 342 communicate via a network, which may be a wireless network, with other instances of switch matrices and management modules. In some embodiments, such a network may be an ad-hoc network of said components communicating with one another absent a centralized network infrastructure. Switch matrices and management components networked in any of the above fashions can be further configured to switch from a main power supply to a second power supply based on suitable factors other than a detected power supply instability or user input. For example, a single power input line can be used to supply power to multiple switch matrices. If multiple switch matrices are connected to a single power input line, and it is determined that the available power is less than a desired amount of available power, then a subset of the switch matrices can be instructed to switch to a backup power input line.

In some embodiments, the system 300 is configured to monitor any suitable combination of main input voltage, main input current, backup input voltage, backup input current, output line voltage, and output line current. For example, the voltages sensed by the main line voltage sensor 304, the backup line voltage sensor 322, and the output voltage sensor 316 can be sampled at a rate suitably high enough to capture the waveform of the input and output voltages. The captured voltage waveforms can be recorded to memory for subsequent access for switching event evaluation purposes. For example, the input and output voltage waveforms from a suitable time prior to a switching event (e.g., 50 ms) to a suitable time after the switching event (e.g., 50 ms) can be stored for subsequent access for switching event evaluation purposes. In a similar manner, currents sensed by the main line current sensor 306, the backup line current sensor 324, and the output current sensor 314 can be sampled at a rate suitably high enough to capture the waveform of the input and output currents. The captured current waveforms can be recorded to memory for subsequent access for switching event evaluation purposes. For example, the input and output current waveforms from a suitable time prior to a switching event (e.g., 50 ms) to a suitable time after the switching event (e.g., 50 ms) can be stored for subsequent access for switching event evaluation purposes. The voltage waveform data and/or the current waveform data can be saved in memory for any suitable number of switching events (e.g., 10). The voltage waveform data and/or the current waveform data provides in depth visibility into any power transient event. The voltage waveform data and/or the current waveform data can be transmitted to a remote server for storage, thereby freeing up memory in the system 300 to record further voltage waveform data and/or current waveform data.

Figure 4:
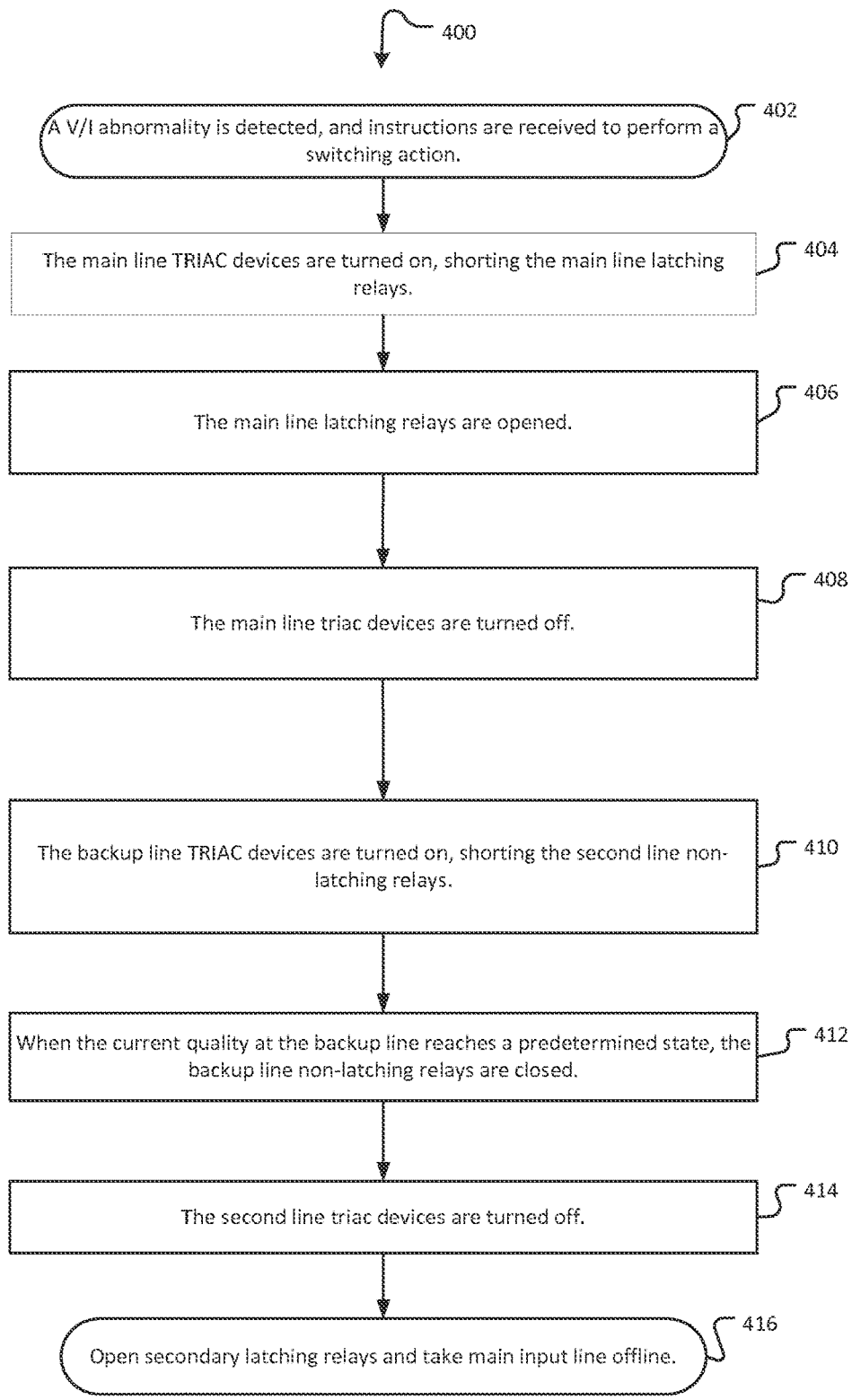
FIG. 4 is an example process for switching between power sources, in accordance with embodiments.

FIG. 4 is a process flow diagram illustrating an example process 400 for switching between power sources, in accordance with embodiments. Some or all of the process 400 (or any other processes described herein, or variations, and/or combinations thereof) can be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In the process 400, a voltage and/or current (V/I) abnormality is detected and instructions are received to perform a switching action (act 402). For example, a voltage and/or current abnormality can be detected via any of the main line voltage sensor 304, main line current sensor 306, output voltage sensor 316, or output current sensor 314 (FIG. 3). For the sake of brevity, the process 400 is described with reference to the main line latching relays such as latching relays 310a and 310b, and backup line non-latching relays 328a, 328b (FIG. 3) and omits explicit reference to the secondary non-latching relays, such as non-latching relays 308a, 308b, 326a, 326b.

Responsive to instructions to perform a switching operation triggered by detecting the voltage and/or current abnormality, the system turns on the main line TRIAC devices, thereby shorting the main line latching relays (act 404). The system then opens the main line latching relays (act 406). The system causes the main line TRIAC devices to shut off (act 408), closing the connection with the main input line. The system turns on the backup line TRIAC devices, shorting the second line non-latching relays and allowing current to flow from the backup line, such as backup input line 320a, 320b (FIG. 3) (act 410). The system causes the backup line non-latching relays to close (act 412). The system causes the backup line TRIAC devices to shut off (act 414), such that current from the backup line input flows through the non-latching relays. The system can subsequently perform additional steps, such as opening secondary latching relays to safely isolate the main input line for service (act 416), or other suitable steps.

Figure 5:
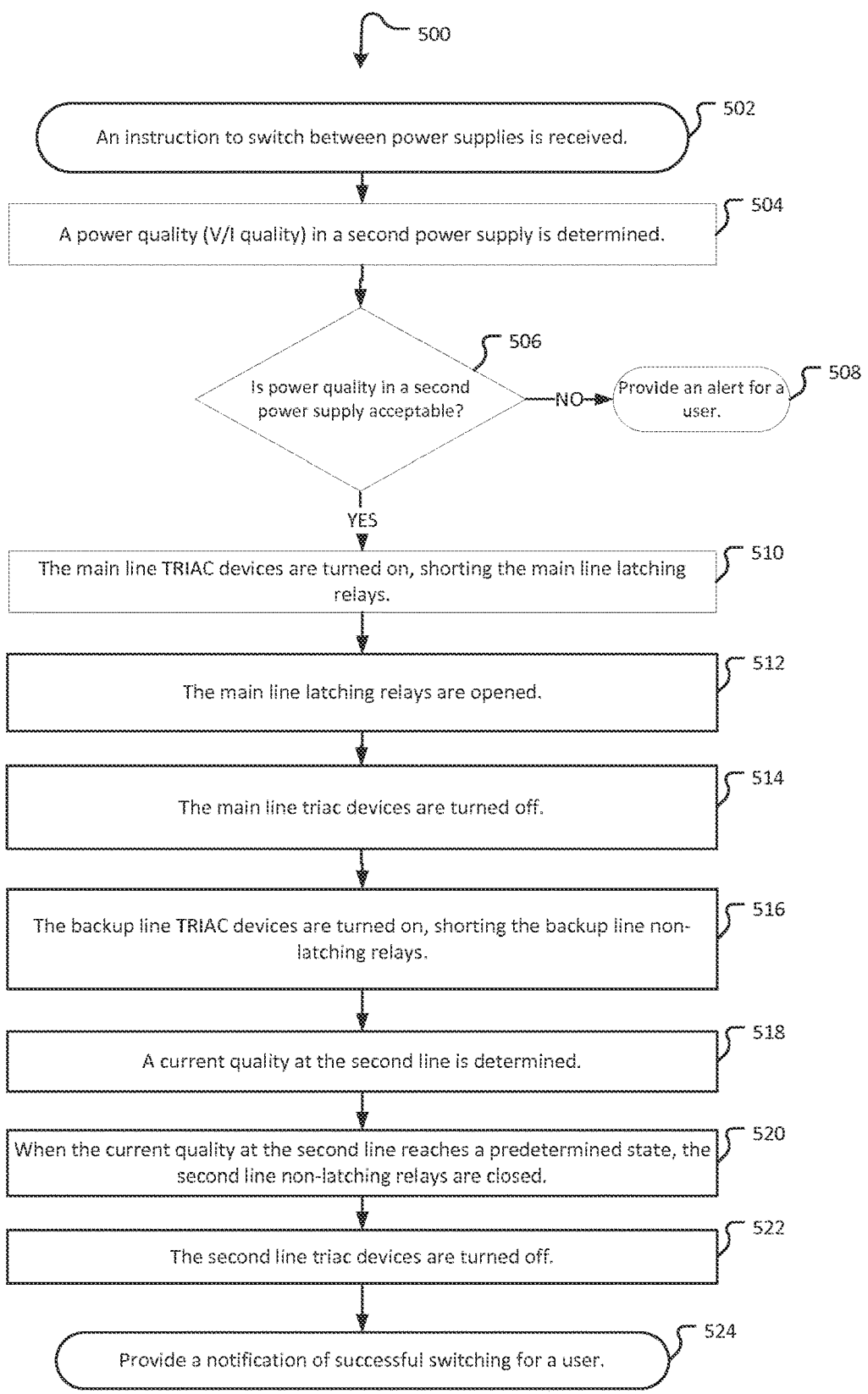
FIG. 5 is another example process for switching between power sources, in accordance with embodiments.

FIG. 5 is a process flow diagram of an alternative example process 500 for switching between power sources, in accordance with embodiments. In the process 500, the system receives an instruction to switch from a main power supply to a backup power supply (act 502).

The system determines a power quality (voltage quality and/or current quality) in a backup input line (act 504) and compares the determined power quality to a threshold power quality (act 506). If the power quality of the backup input line does not meet the threshold, (e.g., the backup power supply is offline,) then the system provides an alert for a user (act 508) (which can be relayed via a network and user interface module, for example, the network 344 and user interface module 346 of system 300 shown in FIG. 3).

If the power quality of the backup input line meets the threshold requirements, the system turns on the main line TRIAC devices to short the main line latching relays (act 510). (Note again that main line latching relays in the process 500 refers to the relays that are parallel to the TRIAC devices, such as the second main line latching relays 310a, 310b shown in FIG. 3.)

When the main line latching relays are unloaded by the main line TRIAC devices, the system can close the main line latching relays (act 512). The system turns off the main line TRIAC devices (act 514). The system turns on the backup line TRIAC devices, shorting the backup line non-latching relays (act 516). The system can subsequently assess the power quality (e.g., voltage quality and/or current quality) at the backup input line (act 518), and when the power quality at the backup line meets a threshold value, the system can close the backup line non-latching relays (act 520). The system can turn off the backup line TRIAC devices (act 522), and then provide a notification for a user that a successful switch has occurred (act 524).

Figure 6:
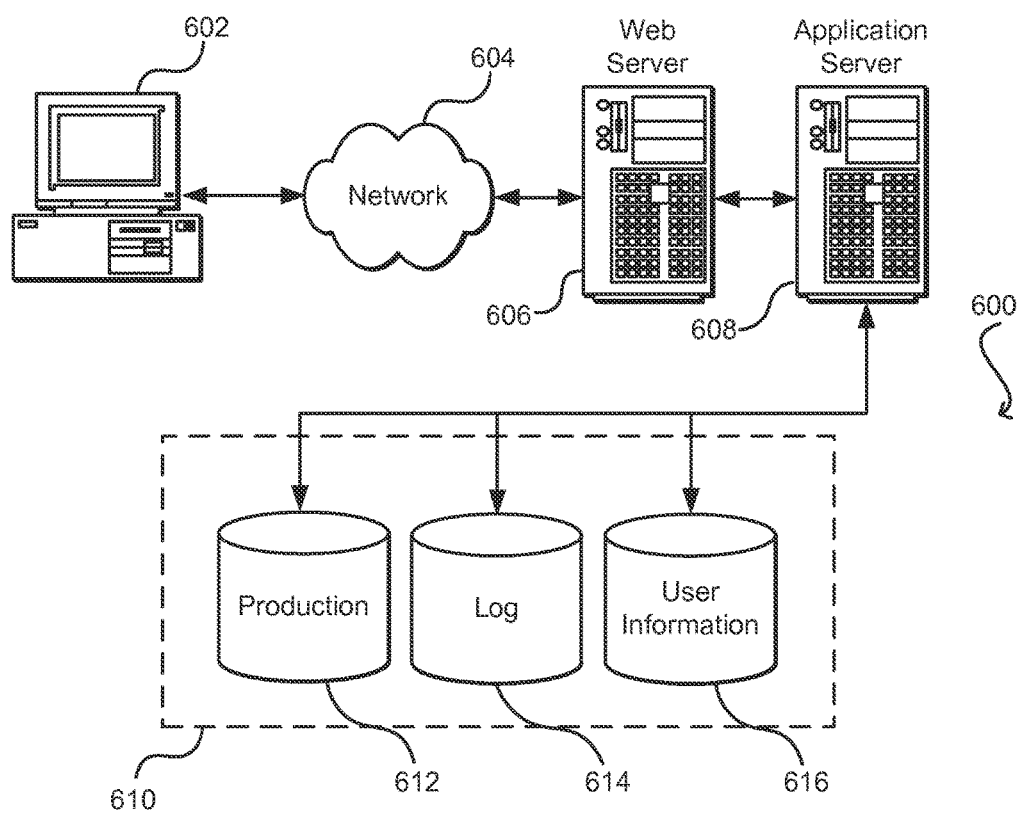
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. For example, while the embodiments are described herein as including TRIAC devices, any suitable solid state relay can be used in place of any TRIAC device employed in embodiments described herein. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed.

No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for switching between AC power sources for powering electronic components in a datacenter, the system comprising:
    a switching device comprising:
        a main line assembly including a main line, a sensor, a main line latching relay, and a main line solid-state relay in parallel with the main line latching relay, wherein the main line latching relay is configured to maintain state absent a signal instructing a state change; and
        a backup line assembly including a backup line, a backup line non-latching relay, and a backup line solid-state relay in parallel with the backup line non-latching relay, wherein the backup line non-latching relay is configured to return to a default state absent a signal instructing a state change; and
    a management module operatively coupled with the switching device and configured with executable instructions to operate the switching device responsive to irregularities in the main line in order to:
        cause the main line solid-state relay to close to short the main line latching relay;
        open the main line latching relay while the main line latching relay is shorted by the main line solid-state relay;
        open the main line solid-state relay;
        cause the backup line solid-state relay to close to short the backup line non-latching relay;
        close the backup line non-latching relay while the backup line non-latching relay is shorted by the backup line solid-state relay; and
        open the backup line solid-state relay.

2. The system of claim 1, further comprising an output line configured to transfer power from the switching device to one or more electronic devices.

3. The system of claim 1, further comprising a plurality of secondary main line latching relays configured to isolate the main line from the switching device.

4. The system of claim 1, wherein the management module is further configured with executable instructions to operate the switching device in order to:
detect a power failure via the sensor; and
initiate a switching action due at least in part to detecting the power failure.

5. A method for switching between two or more electrical power sources, the method comprising:
receiving an instruction to switch from a first input line to a second input line, wherein the first input line is electrically connected to an output line via a first switch assembly, wherein the first switch assembly comprises a first latching relay in parallel with a first solid-state relay, and wherein the second input line is electrically connectible with the output line via a second switch assembly comprising a non-latching relay in parallel with a second solid-state relay, wherein the first latching relay is configured to maintain state absent a signal instructing a state change and the non-latching relay is configured to return to a default state absent a signal instructing a state change;
causing, at the first switch assembly, the first solid-state relay to close such that the first latching relay is short circuited;
causing the first latching relay to open while the first latching relay is shorted by the first solid-state relay;
causing the first solid-state relay to open such that first input line becomes electrically disconnected from the output line; and
causing the non-latching relay to close such that the second input line becomes electrically connected with the output line.

6. The method of claim 5, wherein:
the second switch assembly further comprises a second solid-state relay in parallel with the non-latching relay;
the method further comprises:
causing the second solid-state relay to close such that the non-latching relay is short-circuited; and
causing the non-latching relay to close while the second relay is shorted via the second solid-state relay.

7. The method of claim 5, wherein:
the second switch assembly further comprises a backup latching relay; and
the method further comprises causing the backup latching relay to open so that the second input line is electrically isolated from the second solid-state relay and non-latching relay by the backup latching relay.

8. The method of claim 5, further comprising causing an alert to be provided to a user.

9. The method of claim 5, wherein the instruction is generated based on a detected current or voltage at the first input line.

10. The method of claim 5, further comprising:
detecting at least one of a first current or voltage at the first input line, a second current or voltage at the second input line, and a third current or voltage at the output line; and
generating the instruction based on at least one of the first, second, or third voltages or currents.

11. The method of claim 5, further comprising:
receiving a user instruction originating from a user input indicating directions to initiate a switching operation; and
generating the instruction to switch from the first input line to the second input line based on the user instruction.

12. A system, comprising:
a switching device comprising:
a first line assembly comprising:
a first electrical line;
a first line sensor;
a first line latching relay configured to maintain state absent a signal instructing a state change; and
a first line solid-state relay in parallel with the first line latching relay; and
a second line assembly comprising:
a second electrical line;
a second line non-latching relay configured to return to a default state absent a signal instructing a state change; and
a second line solid-state relay in parallel with the second line relay; and
a management module operatively coupled with the switching device and configured with executable instructions responsive to irregularities in the first line to operate the switching device in order to:
cause the first line solid-state relay to close to short the first line latching relay;
cause the first line latching relay to open while the first line latching relay is shorted via the first line solid-state relay; and
cause the first line solid-state relay to turn off.

13. The system of claim 12, wherein
the management module is further configured with executable instructions to operate the switching device in order to:
cause the second line solid-state relay to close to short the second line non-latching relay;
cause the second line non-latching relay to close while the second line relay is shorted via the second line solid-state relay; and
cause the second line solid-state relay to open.

14. The system of claim 13, further comprising a first line backup relay configured to disconnect the first electrical line; and wherein the management module is further configured with executable instructions to:
detect that a switching act has occurred, and
cause the first line backup relay to open responsive to detecting the switching act.

15. The system of claim 13, further comprising a second line backup relay configured to disconnect the second electrical line and a second line sensor at the second electrical line; and wherein the management module is further configured with executable instructions to:
detect a power supply abnormality at the second electrical line via the second line sensor; and
cause the second line backup relay to open responsive to detecting the power supply abnormality.

16. The system of claim 13, wherein the management module is further configured with executable instructions to:
receive information concerning a current or voltage on the first electrical line; and
initiate a switching act based on the received information.

17. The system of claim 13, wherein the management module is further configured with executable instructions to:
receive information concerning a power supply interruption on the first electrical line; and
initiate a switching act based on the received information.

18. The system of claim 13, wherein the management module is further configured with executable instructions to:

receive a user instruction originating from a user input; and initiate a switching act based on the user instruction.

19. The system of claim 12, further comprising an output sensor at an output line; and wherein the management module is further configured with executable instructions to:

receive first data concerning a first voltage or current at the output line via the output sensor;

receive second data concerning a second voltage or current at the input line via the first line sensor; and initiate a switching act based in part on at least one of the first and second data.

* * * * *